United States Patent
Ito et al.

(10) Patent No.: US 6,351,074 B1
(45) Date of Patent: Feb. 26, 2002

(54) DISCHARGE LAMP DEVICE FOR VEHICLE

(75) Inventors: Masayasu Ito; Hitoshi Takeda; Shuji Matsuura; Akihiro Mochizuki; Hiroki Ishibashi; Akihiro Matsumoto, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/655,454

(22) Filed: Sep. 5, 2000

(30) Foreign Application Priority Data

Sep. 10, 1999 (JP) .......................... 11-257467
May 26, 2000 (JP) ....................... P 12-156416

(51) Int. Cl.[7] .............................................. B60Q 1/02
(52) U.S. Cl. ...................... 315/82; 315/307; 315/291; 307/10.8
(58) Field of Search ......................... 315/82, 77, 224, 315/291, 294, DIG. 7, 307, 308; 307/10.8

(56) References Cited

U.S. PATENT DOCUMENTS

| | | | |
|---|---|---|---|
| 5,142,203 A | | 8/1992 | Oda et al. ................... 315/308 |
| 5,191,266 A | * | 3/1993 | Futami et al. ............... 315/307 |
| 5,212,428 A | | 5/1993 | Sasaki et al. ............... 315/308 |
| 5,270,620 A | * | 12/1993 | Basch et al. ................ 315/291 |
| 5,449,973 A | | 9/1995 | Yamashita et al. .......... 315/82 |
| 5,572,094 A | | 11/1996 | Yamashita et al. .......... 315/308 |
| 5,923,125 A | * | 7/1999 | Endo ........................... 315/82 |
| 6,140,770 A | * | 10/2000 | Nepote et al. ................ 315/82 |

FOREIGN PATENT DOCUMENTS

DE 4020878 A1 1/1991

* cited by examiner

Primary Examiner—Don Wong
Assistant Examiner—Ephrem Alemu
(74) Attorney, Agent, or Firm—Fish & Richardson P.C.

(57) ABSTRACT

A steady-state condition in which respective discharge lamps for main beam and for dipped beam are both turned on, a sum (P1+P2) of a value of power supplied to each discharge lamp is controlled to be smaller than a sum (P1R+P2R) of a rated power value for each discharge lamp.

11 Claims, 12 Drawing Sheets

DISCHARGE LAMP DEVICE FOR VEHICLE

BACKGROUND OF THE INVENTION

1. Field of the Invention

The present invention relates to a technique for reducing the size and cost of a discharge lamp device for a vehicle. The device is configured to turn on and control a plurality of discharge lamps with a lighting circuit.

2. Background of the Invention

A known lighting circuit for a discharge lamp (such as a metal halide lamp) as a light source for a vehicle includes a DC power circuit, a DC-AC converting circuit and a starting circuit (a so-called starter circuit).

When a plurality of discharge lamps is used as a light source, they need to be controlled. If the lighting circuit for control is provided for each discharge lamp, a problem of cost and space becomes a factor.

For example, when separate discharge lamps (a so-called four-lamp illumination) for a vehicle serve as a main beam (high beam) and a dipped beam (low beam) respectively, a pair of discharge lamps is required for each side of the vehicle and a lighting circuit is required for each pair of discharge lamps. A rated power is supplied to the discharge lamps after the lamps are turned on and reach a steady lighting state so that constant power can be controlled.

In a conventional device, a rated power of the discharge lamp is supplied to a discharge lamp for main beam and a discharge lamp for dipped beam when they are turned on and in steady-state. Consequently, a load on the lighting circuit becomes a factor of consideration.

In other words, if the sum of the value of the power supplied to the discharge lamp is large, a power loss calculated based on the efficiency of the lighting circuit is increased. Therefore, a circuit component may encounter heat and failure problems. In terms of durability, circuit components would have to have higher breakdown voltage and current values. Such components lead to increased costs and size of a circuit.

An object of the present invention is to reduce the size and cost of a discharge lamp device for a vehicle, which can turn on both a discharge lamp for main beam and a discharge lamp for dipped beam.

SUMMARY OF THE INVENTION

An implementation of the present invention provides a discharge lamp device for a vehicle comprising a discharge lamp for main beam, a discharge lamp for dipped beam and a lighting circuit capable of controlling lighting of the discharge lamps at the same time, wherein a power supply is controlled such that a sum of a value of power supplied to each of the discharge lamps is smaller than that of a rated power value of the discharge lamp in a steady-state condition in which the discharge lamps are on.

According to an implementation of the present invention, the sum of the supplied power values under steady lighting state of each discharge lamp is smaller than that of the rated power value of the discharge lamp. Consequently, it is not necessary to use components having a high breakdown voltage value for the lightning circuit as those in the conventional device.

DETAILED DESCRIPTION OF THE PREFERRED EMBODIMENTS

Before the explanation of the structure of a discharge lamp device for a vehicle according to an implementation of the present invention, the power control for a discharge lamp will be described below with reference to FIGS. 1 to 5.

Figure 1:
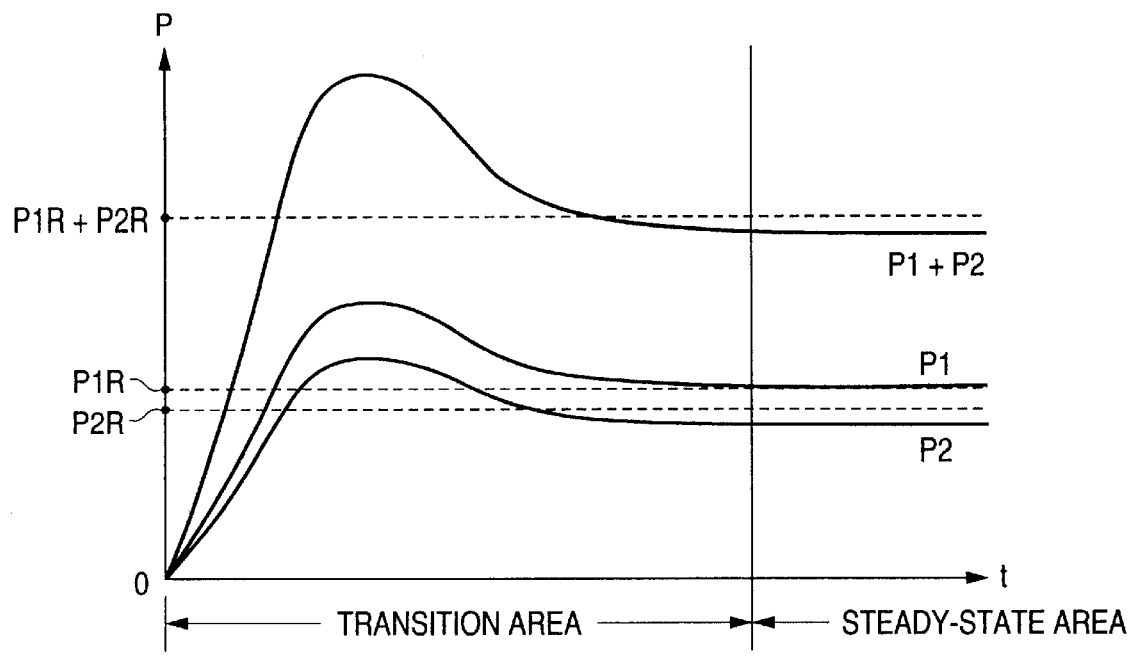
FIG. 1 is a graph illustrating the basic operation of a discharge lamp device for a vehicle according to an implementation of the present invention.

FIG. 1 is a graph schematically illustrating a temporal change in power. The abscissa indicates time "t" and the ordinate indicates power "P" supplied to a discharge lamp. Graph curves P1 and P2 denote a temporal change in power supplied to two discharge lamps respectively. A graph curve "P1+P2" denotes a temporal change in the sum of the value of power supplied to each discharge lamp. "P1R" denotes the rated power value of a discharge lamp indicated in the graph curve P1. "P2R" denotes the rated power value of the discharge lamp indicated in the graph curve P2. "P1R+P2R" denotes the total value thereof.

In the example of FIG. 1, two discharge lamps are simultaneously turned on at time t=0. A luminous flux of the discharge lamp rises quickly such that the supply of power exceeds a rated value in the initial stage of lighting (which will be hereinafter referred to as a transient domain). Thereafter, a steady-state condition or a steady lighting state (hereinafter referred to as a steady-state domain) is reached under constant power control.

In the steady-state domain in which both discharge lamps are turned on, the power supply is controlled in such a manner that the sum (P1+P2) of the value of the power supplied to the discharge lamp is smaller than the sum (P1R+P2R) of the rated power value of the discharge lamp. Consequently, the load of the lighting circuit is reduced so that the power loss calculated based on the efficiency of the lighting circuit is reduced greater than that of the conventional example. Consequently, expensive elements of high durability can be obviated.

In FIG. 1, P1R is not equal to P2R but if P1R=P2R (=PR), the power is controlled in such a manner that the sum P1 +P2 of the supplied power values in the steady-state condition would be smaller than "2·PR" (this is the same in the following description with reference to FIGS. 2 to 5).

To form the relationship of (P1+P2)<(P1R+P2R), the following methods can be used.

A method of supplying a smaller power than a rated power value for one of the discharge lamps.

A method of supplying a smaller power than rated power values for both discharge lamps.

A method of supplying a greater power than the rated power value for one of the discharge lamps and supplying a smaller power than the rated power value for the other discharge lamp.

In method (i), the power supplied to one of the discharge lamps, for example, P1 is controlled to be P1=P1R in the steady-state condition and P2 is controlled to be P2<P2R for the other discharge lamp.

In method (ii), the power is controlled to be "P1<P1R" and P2<P2R in steady-state.

In method (iii), for example, the power is controlled to be P1>P1R for one of the discharge lamps and to be P2<P2R for the other discharge lamp in steady-state. Each power value is defined to form a relationship for the sum of the supplied power value.

Figure 2:
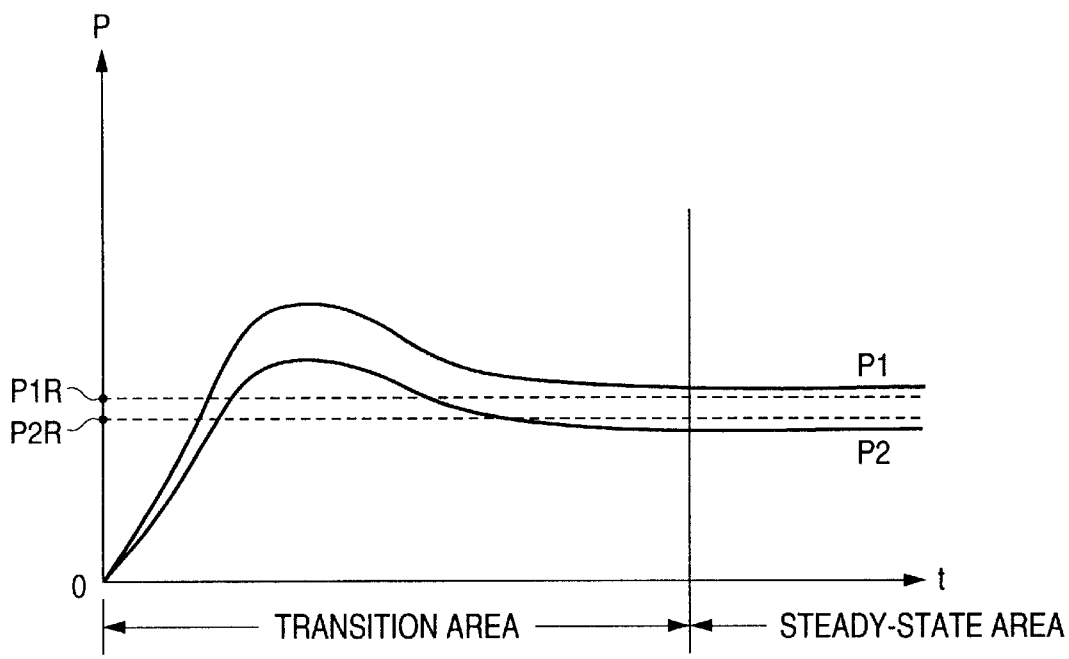
FIG. 2 is a graph schematically showing a state in which power control is carried out such that a power supplied to one of discharge lamps is greater than a rated value thereof and a power supplied to the other discharge lamp is smaller than a rated value thereof in a steady-state domain.

FIG. 2 schematically shows the state, in which the abscissa indicates time "t," the ordinate indicates power "P" supplied to the discharge lamp. A temporal change in the supplied power values P1 and P2 is illustrated.

The relationships of P1>P1R and P2<P2R are formed in the steady-state domain.

In the application to a lighting tool for a vehicle, P1 denotes a value of power supplied to the discharge lamp for main beam and P2 denotes a value of power supplied to the discharge lamp for dipped beam. When the discharge lump for main beam and the discharge lamp for dipped beam are turned on, the power supply can be controlled in such a manner that the value of the power supplied to the discharge lamp for main beam is greater than the rated power value of the same discharge lamp and the value of the power supplied to the discharge lamp for dipped beam is smaller than the rate power value of the same discharge lamp. The reason is that the light distribution for main beam is mainly carried out in the state in which both discharge lamps are turned on. Therefore, when the value of the power supplied to the discharge lamp for dipped beam is decreased more than the rated power value to reduce the total power value, the whole light distribution is affected less.

In FIGS. 1 and 2, power exceeding the rated power is supplied to each discharge lamp in a transient domain, which is between the time the discharge lamp is turned on and the time the steady-state condition is reached. If the power supplied to one of the discharge lamps is smaller than the rated power value thereof in the transient domain, the load on the lighting circuit can be reduced during the transient period before the discharge lamp reaches steady-state.

Figure 3:
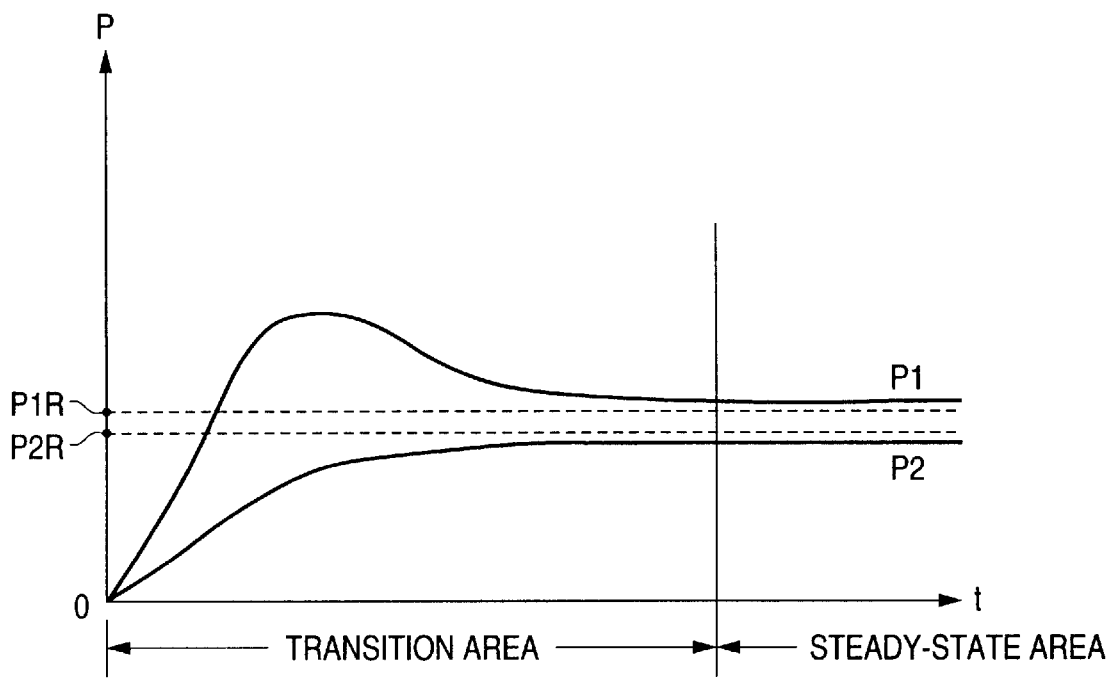
FIG. 3 is a graph schematically showing a state in which power control is carried out such that a power supplied to one of the discharge lamps is smaller than a rated value thereof in a transient domain.

FIG. 3 illustrates a temporal change in the supplied power values P1 and P2. The abscissa indicates time "t" and the ordinate indicates power "P" supplied to the discharge lamp.

In the example, after each supplied power value rises at t=0, the power gradually approaches the power value of each discharge lamp in steady-state. The supplied power value P2 is controlled so as not to exceed P2R in both the transient domain and the steady-state domain.

The following can be employed for the application of the lighting tool for a vehicle:

a) P1 denotes the power supplied to the discharge lamp for main beam and P2 denotes the power supplied to the discharge lamp for dipped beam.

b) P1 denotes the power supplied to the discharge lamp for dipped beam and P2 denotes the power supplied to the discharge lamp for main beam.

Case a) is preferable to case b) in that the time for turning the discharge lamp for main beam on is shortened, and the main part of the light distribution is based on the lighting of the discharge lamp for main beam as described above. With the discharge lamps for main beam and for dipped beam turned on, heat generated by a circuit element can be suppressed during the transient domain if the power supply is controlled such that the value of the power supplied to one of the discharge lamps is smaller than the rated power value of the discharge lamp.

Instead of decreasing the value of the power supplied to one of the discharge lamps in the transient domain after the discharge lamp is turned on, it can also be effective to shift the control timing such that peaks corresponding to maximum values of power supplied to discharge lamps do not coincide with one another.

Figure 4:
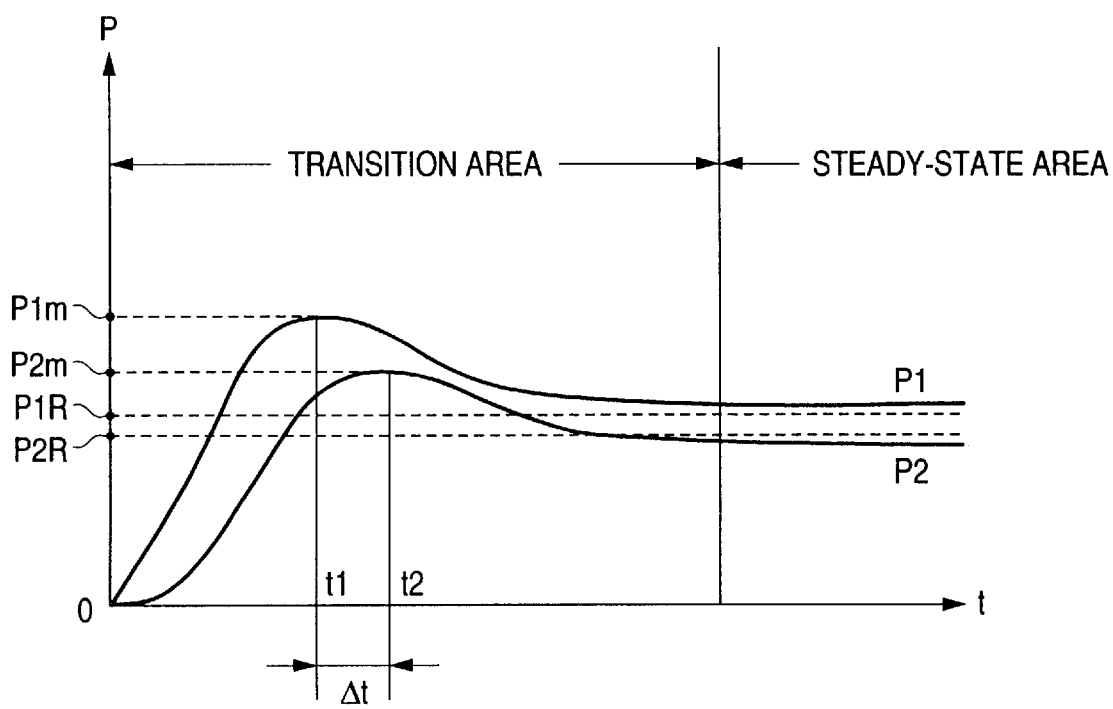
FIG. 4 is a graph schematically showing a state in which the power control is carried out such that a time that a maximum power is given in the transient domain is shifted.

FIG. 4 schematically shows an example of such control, in which a temporal change in the supplied power values "P1" and "P2" is indicated. The abscissa denotes time "t" and the ordinate denotes power "P" supplied to the discharge lamp.

In the example, P1 denotes power supplied to the discharge lamp for main beam and P2 denotes power supplied to the discharge lamp for dipped beam. At t=t1, P1 takes a maximum value P1m. At t=t2 (>t1), P2 takes a maximum value P2m.

The value P1 of the power supplied to one of the discharge lamps rises at t=0, takes the maximum power value P1m exceeding P1R at t=t1 and is decreased gradually to approximate a steady-state value. The value P2 of the power supplied to the other discharge lamp rises at t=0, takes the maximum power value P2m exceeding P2R at t=t2 with a shift of Δt from the peak time t1 of P1 and is decreased gradually to approximate a steady-state value.

When the discharge lamp for main beam and the discharge lamp for dipped beam are thus turned on at the same time, the load of the lighting circuit in the transient domain can be reduced effectively if control is carried out such that the time of maximum power supplied to one discharge lamp is shifted in relation to the time of maximum power supplied to another. That is, the control is carried out such that one of the discharge lamps is turned on and the other discharge lamp is turned on with a slight delay.

While the power control is carried out to establish P1>P1R and P2<P2R in the steady-state domain in FIGS. 3 and 4 (see method (iii)), methods (i) and (ii) may also be employed.

While the situation in which the two discharge lamps are turned on simultaneously or almost simultaneously has been described above, an example of control in which one of the discharge lamps is turned on with the other discharge lamp already turned on will be described with reference to FIG. 5.

Figure 5:
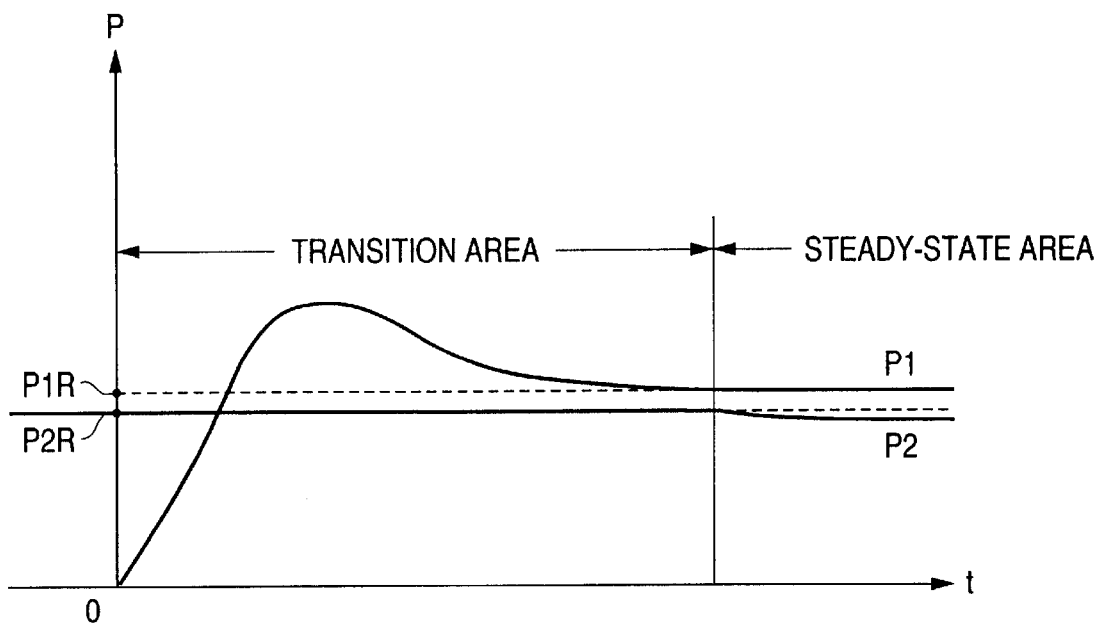
FIG. 5 is a graph schematically showing a state in which a power supplied to one of the discharge lamps is gradually reduced when the lighting state of the other discharge lamp goes into the steady-state domain.

In FIG. 5, a temporal change in the supplied power values P1 and P2 is shown. The abscissa denotes time "t" and the ordinate denotes power "P" supplied to the discharge lamp.

In the example, P1 denotes a value of power supplied to the discharge lamp for main beam and P2 denotes a value of power supplied to the discharge lamp for dipped beam.

The discharge lamp for dipped beam has already been turned on at t=0. In this state, the discharge lamp for main beam is turned on. The value P2 of power supplied to the discharge lamp for dipped beam can be gradually decreased when the discharge lamp for main beam reaches steady-state after lighting (the time of transition to the steady-state domain). Thus, the power can be controlled such that the power value P2 is smaller than the rated power value P2R. The reason is as follows. If the power supplied to the discharge lamp for dipped beam is immediately reduced at the time of t=0, illumination may not be sufficiently maintained before the discharge lamp for main beam is stabilized and a change in the dipped beam may have negative impact on other drivers.

A structure according to implementations of the present invention will be described below.

Figure 6:
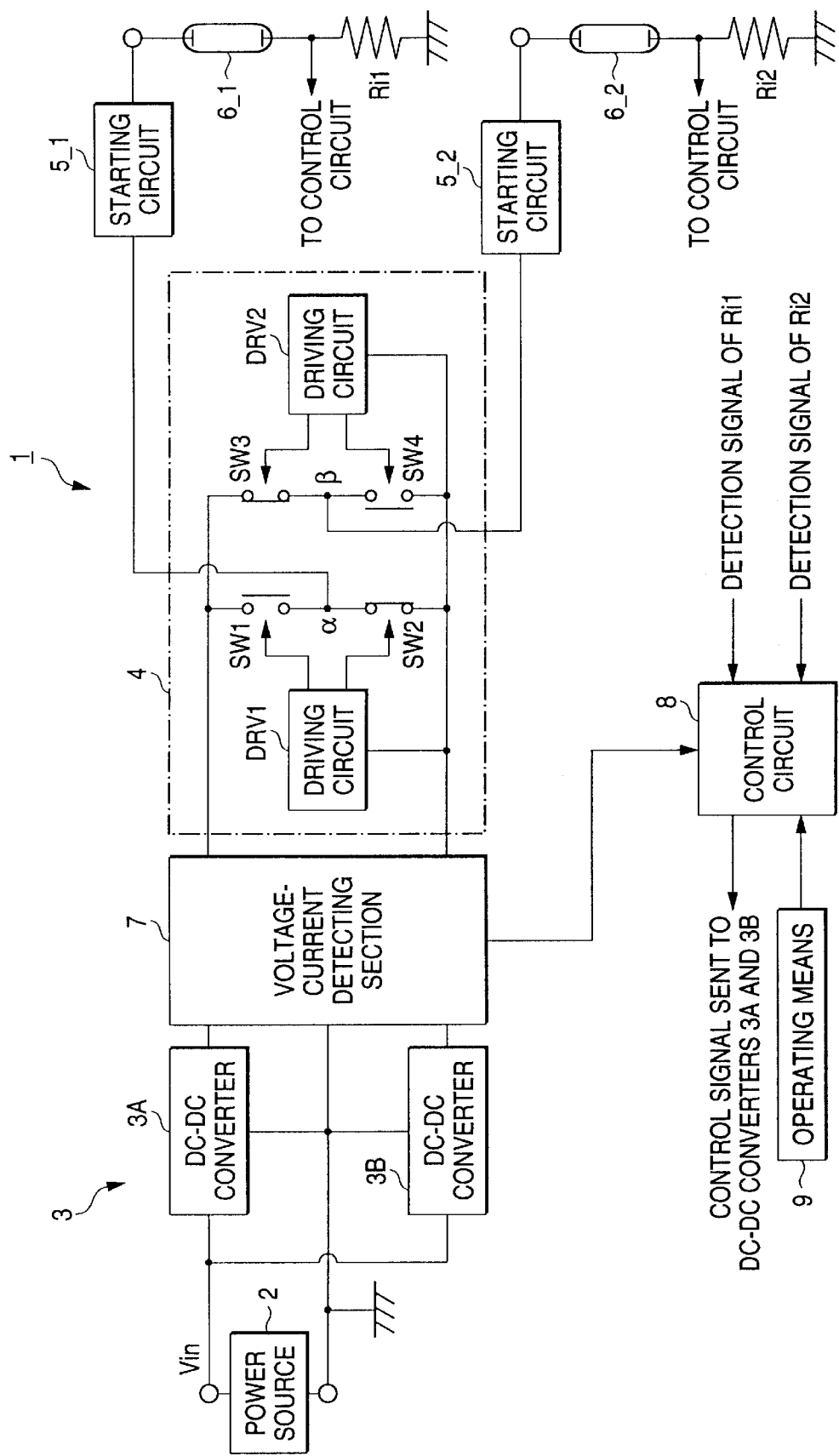
FIG. 6 is a circuit block diagram showing an example of the structure of a lighting circuit of the discharge lamp device according to an implementation of the present invention.

FIG. 6 shows an example of the structure of a circuit according to an implementation of the present invention, comprising a lighting circuit capable of simultaneously carrying out lighting control in a discharge lamp for main beam and a discharge lamp for dipped beam.

The lighting circuit constituting a discharge lamp device 1 for a vehicle comprises a power source 2 (a battery), a DC power circuit 3, a DC-AC converting circuit 4 and a starting circuit 5 (5_1, 5_2).

The DC power circuit 3 is constituted by using two DC—DC converters 3A and 3B, for example, and is shared by two discharge lamps 6_1 and 6_2. The DC power circuit 3 outputs a predetermined DC voltage upon receipt of a DC input voltage (hereinafter referred to as "Vin") applied from the power source 2, and an output voltage thereof is variably controlled in response to a control signal sent from a control circuit which will be described below. A DC-DC converter (of a chopper type or a fly back type) having the structure of a switching regulator is used for the DC power circuit 3. A first circuit section (DC-DC converter 3A) for obtaining a voltage output having a positive polarity (a positive voltage output) and a second circuit section (a DC-DC converter 3B) for obtaining a voltage output having a negative polarity (a negative voltage output) is provided in parallel with each other.

The DC-AC converting circuit 4 is provided in a stage subsequent to the DC power circuit 3 and serves to convert an output voltage thereof to an alternating voltage and then to supply the alternating voltage to the discharge lamp. Consequently, voltages having positive and negative polarities are output from the output terminals of the DC power circuit 3. The circuit 4 has a structure of a full bridge type comprising four switch elements sw1, sw2, sw3 and sw4 (for which a semiconductor switch element such as a field effect transistor is used and which is simply indicated as a symbol for the switch in the drawing).

More specifically, the switch elements sw1 and sw2 are connected to each other in series and make a first pair. One of the ends of the switch element sw1 is connected to the output terminal of the DC-DC converter 3A, and the other end of the switch element sw1 is connected to the output terminal of the DC-DC converter 3B through the switch element sw2. A first discharge lamp 6_1 is connected to a connecting point a of both switch elements through (an inductive load of) the starting circuit 5_1.

Moreover, the switch elements sw3 and sw4 are connected to each other in series and make a second pair. One of the ends of the switch element sw3 is connected to the output terminal of the DC-DC converter 3A, and the other end of the switch element sw3 is connected to the output terminal of the DC-DC converter 3B through the switch element sw4. A second discharge lamp 6_2 is connected to a connecting point β of both switch elements through (an inductive load of) the starting circuit 5_2.

In the stage subsequent to the DC-AC converting circuit 4, any of the terminals of the first and second discharge lamps which is not connected to the connecting points α and β is directly connected to a ground or is connected to the ground through current detecting means (indicated as resistors "Ri1" and "Ri2" for current detection in the drawing).

An IC for a half bridge driver is used for driving circuits DRV1 and DRV2. The driving circuit DRV1 carries out the ON/OFF control of the switch elements sw1 and sw2, and the driving circuit DRV2 carries out the ON/OFF control of the switch elements sw3 and sw4. More specifically, if the state of each element is defined such that the switch element sw1 is brought into an ON state and the switch element sw2 is brought into an OFF state through the driving circuit DRV1 at a certain time, the state of each element is defined such that the switch element sw3 is brought into the OFF state and the switch element sw4 is brought into the ON state through the driving circuit DRV2 at this time. If the state of each element is defined such that the switch element sw1 is brought into the OFF state and the switch element sw2 is brought into the ON state through the driving circuit DRV1 at another time, the state of each element is defined such that the switch element sw3 is brought into the ON state and the switch element sw4 is brought into the OFF state through the driving circuit DRV2 at this time. Thus, the switch elements sw1 and sw4 are brought into the same state and the switch elements sw2 and sw3 are brought into the same state, and they perform an alternating operation reciprocally.

Accordingly, while a voltage having a positive polarity is supplied to the first discharge lamp 6_1 through the ON/OFF operation of two sets of switch elements, for example, a voltage having a negative polarity is supplied to the second discharge lamp 6_2. To the contrary, while a voltage having a negative polarity is supplied to the first discharge lamp 6_1, a voltage having a positive polarity is supplied to the second discharge lamp 6_2.

In a lighting circuit for one discharge lamp (that is, a circuit shown in FIG. 6 serves as the lighting circuit for turning on only the first discharge lamp 6_1, for example), the switch elements sw1 and sw2 and the driving circuit DRV1 may constitute a DC-AC converting circuit, thereby removing a portion related to the second discharge lamp 6_2.

Referring to the starting circuits 5_1 and 5_2, it is preferable that a circuit should be shared between the two discharge lamps 6_1 and 6_2 instead of providing the starting circuits 5_1 and 5_2 as separate circuits, resulting in a reduction in the number of parts and cost.

Examples of detecting a voltage and a current for the discharge lamps 6_1 and 6_2 include the following methods:

(a) a method of detecting a tube voltage of the discharge lamp and a tube current thereof in a stage subsequent to the DC-AC converting circuit; and (b) a method of detecting a signal corresponding to the tube voltage and tube current of the discharge lamp.

Examples of method (a) include a method of connecting resistors (Ri1, Ri2) for current detection to the discharge lamp and converting a flowing current into a voltage to be acquired.

Examples of method (b) include a method in which a voltage and current detecting section 7 is provided between the DC power circuit 3 and the DC-AC converting circuit 4 as shown in FIG. 6 to acquire, as an equivalent signal of the tube voltage, a detected voltage by resistance voltage dividing the output voltage of the DC power circuit 3, and a current detecting resistor for detecting the output current of the DC power circuit 3 is provided on a power supply line to carry out voltage conversion, thereby acquiring the detected current.

A control circuit 8 serves to control mainly the power of the discharge lamp in response to a voltage detection signal and a current detection signal which are related to the discharge lamps 6_1 and 6_2, a signal subjected to an analog arithmetic processing as a signal indicative of the state of lighting of each discharge lamp based on these detection signals and a signal for designating the lighting of each discharge lamp from operating means 9. The operating means 9 includes an operating member necessary for the designation of lighting and lights out, and a detecting element such as a switch interlocking the operation and a detecting circuit. Moreover, if the automatic lighting control of the discharge lamp is to be carried out, the operating means 9 may be replaced by the control circuit for lighting and lights out.

The control circuit 8 generalizes various power control operations described in FIGS. 1 to 5 and basically has the following functions:

defines the sum of supplied power value in the steady-state domain;

defines the supplied power values in a transient domain; and shifts temporally a peak point of the supplied power value in the transient domain for each discharge lamp.

Before those control functions are explained, the structure and operation of a circuit will be described in reference to controlling the power for one discharge lamp.

Figure 7:
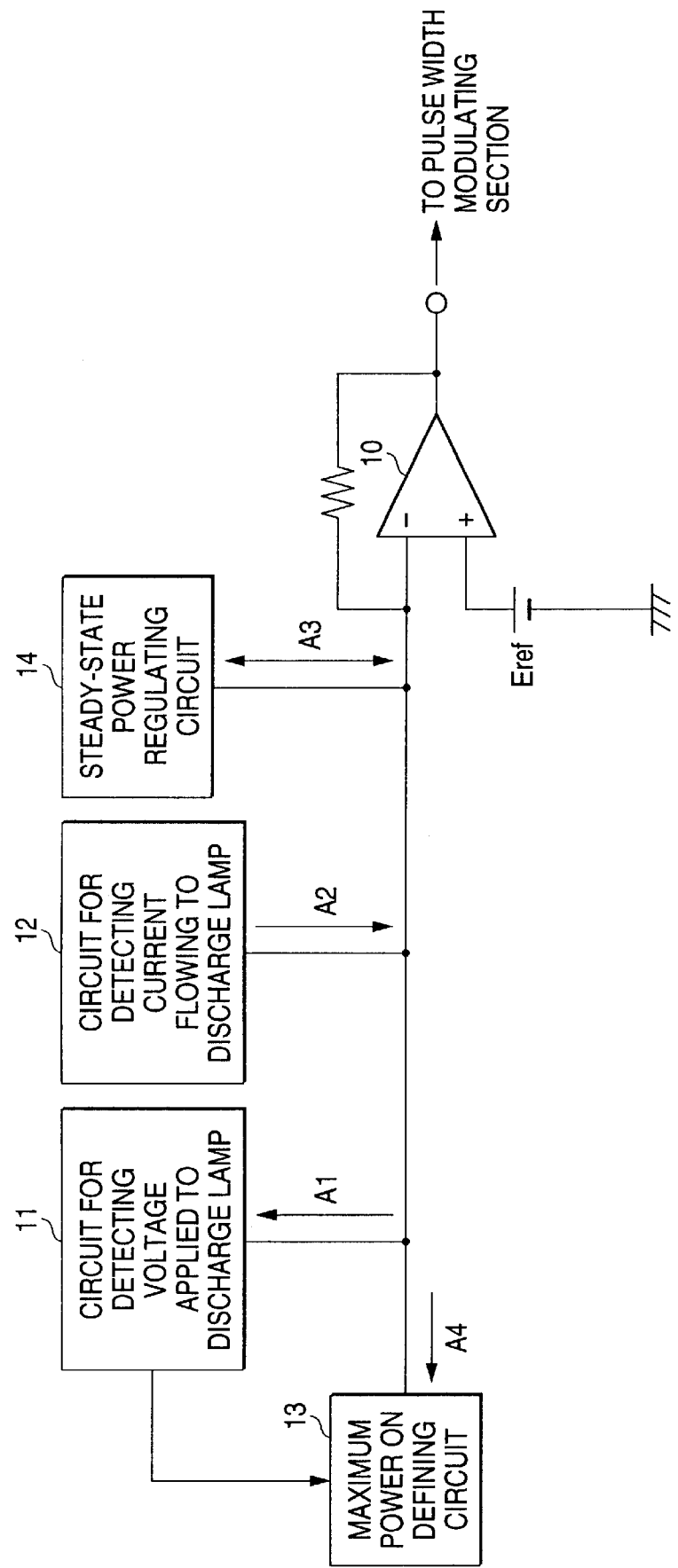
FIG. 7 is a diagram showing the structure of a main part of a control circuit for one of the discharge lamps.

FIG. 7 shows a main part of a structure for a control circuit of a PWM (pulse width modulation) control type, in which a predetermined reference voltage "Eref" (shown by a symbol of a constant voltage source in the drawing) is supplied to a positive side input terminal of an error amplifier 10 and the following circuit (the numerals in parentheses) is connected to a negative side input terminal.

A circuit (11) for detecting a voltage applied to the discharge lamp.

A circuit (12) for detecting a current flowing to the discharge lamp.

A maximum power-on defining circuit (13).

A steady-state power regulating circuit (14).

The voltage detecting circuit 11 and the current detecting circuit 12 serve to detect a voltage and a current for the discharge lamp upon receipt of a signal from the voltage and current detecting section 7.

The maximum power-on defining circuit 13 serves to define the maximum value (or the upper limit allowable value) of the supplied power value in the transient domain in the case in which the discharge lamp is turned on in a cold state (a so-called cold start). Moreover, the steady-state power regulating circuit 14 is required for finely regulating the supplied power value in constant power control in the steady-state domain.

With the present structure, as the output voltage of the error amplifier 10 is higher, the power supplied to the discharge lamp is increased. The error amplifier regulates the output voltage of the DC power circuit 3 such that the negative side input voltage thereof is equal to the reference voltage Eref. The output voltage of the error amplifier 10 is converted into a control signal to be sent to a switching element (semiconductor element) in the DC power circuit 3 through a PWM control section, which is a circuit section constituted by using a general-purpose IC for PWM control and serves to generate a pulse signal having a duty cycle changed according to a result of comparison of an input voltage level with a sawtooth wave, or a driving circuit.

Moreover, arrows indicated as Al to A4 in the drawing represent a part of contribution to an input current to the error amplifier 10. The direction of the arrow indicates a reference of the direction of a control current in each portion. For example, the voltage detecting circuit 11 (see the arrow A1) and the maximum power-on defining circuit 13 (see the arrow A4) have the directions of control currents thereof kept away from the error amplifier 10. Therefore, as a current value flowing in this direction is greater, the power supplied to the discharge lamp is increased. To the contrary, the current detecting circuit 12 (see the arrow A2) has a control current thereof directed toward the error amplifier 10. Therefore, as the value of a current flowing in this direction is greater, the power supplied to the discharge lamp is reduced. The control current of the steady-state power regulating circuit 14 can be regulated in any direction as shown in the bi-directional arrow A3. If the power is regulated to be kept away from the error amplifier 10, the supplied power in the steady-state domain is increased (To the contrary, if the power is regulated to approach the error amplifier, the supplied power in the steady-state is reduced).

In the transient domain, the power supplied to the discharge lamp is defined according to the state of lighting of the discharge lamp through the contribution of the control currents of the voltage detecting circuit 11, the current detecting circuit 12 and the maximum power-on the defining circuit 13. For example, if a low voltage is applied to the discharge lamp, a great power is given to the discharge lamp (the maximum power value thereof is determined by referring to a detected voltage as is apparent from the arrow from the voltage detecting circuit 11 to the maximum power-on defining circuit 13). Moreover, if a current flowing to the discharge lamp is increased, the power supplied to the discharge lamp is reduced.

The constant power control of the discharge lamp in the steady-state domain is carried out such that an equation, V I=W or an equation, V+I=W obtained from linear approximation is established. A tube voltage is represented as "V," a tube current is represented as "I" and a rated power value is represented as "W." In order to obtain higher approximations, the structures of the voltage detecting circuit and the current detecting circuit may be complicated such that approximation to a constant power curve is carried out by using a large number of polygonal lines. However, it is necessary to consider disadvantages with an increase in the number of parts.

It can be supposed that a control current is not generated by the maximum power-on defining circuit 13 in the steady-state domain. Therefore, the control is carried out such that the total control currents of the voltage detecting circuit 11, the current detecting circuit 12 and the steady-state power regulating circuit 14 can be zero ampere. In this state, the input voltage and the reference voltage in the error amplifier 10 are well-balanced. However, if this relationship were lost, for example, the input voltage may be dropped, and the output voltage of the amplifier may be raised so that power supply is increased. To the contrary, the input voltage is raised, and the output voltage of the amplifier is dropped so that the power supply is reduced.

The structure of the control circuit according to the present invention will be described below, in which the following circuit configuration will be taken as an example.

(I) A configuration in which the sum of power supplied to the discharge lamp for main beam and the discharge lamp for dipped beam is controlled with the output of one error amplifier.

(II) A configuration in which the power supplied to the discharge lamp for main beam and the discharge lamp for dipped beam is controlled with the outputs of error amplifiers (two amplifiers) according to the power control of each discharge lamp.

Figure 8:
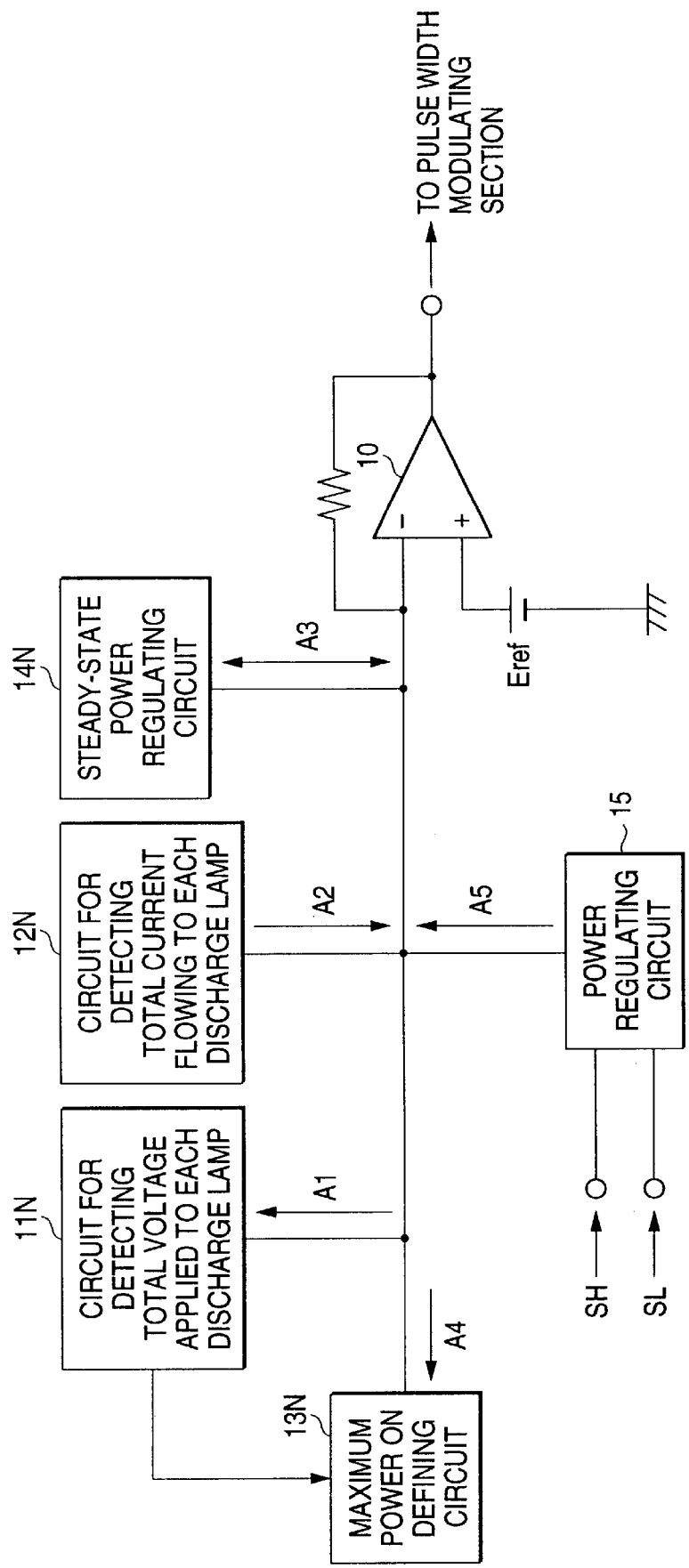
FIG. 8 is a diagram showing the structure of a main part of a first circuit configuration of the control circuit according to an implementation of the present invention.

FIG. 8 shows an example of the structure of the circuit configuration shown in (I) and is different from the structure shown in FIG. 7 as follows.

The voltage detecting circuit 11 is replaced by a voltage detecting circuit 11N for detecting the sum of values of voltages applied to the two discharge lamps.

The current detecting circuit 12 is replaced by a current detecting circuit 12N for detecting the sum of values of currents flowing to the two discharge lamps.

Power control is carried out by a maximum power-on defining circuit 13N and a steady-state power regulating section 14N for the sum of the power values to both discharge lamps when the two discharge lamps are on.

A power regulating circuit 15 for regulating the total power value in response to a signal representing the lighting of the discharge lamp for main beam (which includes a lighting indication signal for the discharge lamp and a signal representing that the discharge lamp is on and will be hereinafter referred to as "SH") and a signal representing the lighting of the discharge lamp for dipped beam (which includes a lighting indication signal for the discharge lamp and a signal representing that the discharge lamp is on and which will be hereinafter referred to as "SL") is attached to the negative side input terminal of the error amplifier 10.

The arrows A1 to A4 shown in the drawing are used for the control current of a circuit section corresponding to each portion in FIG. 7, and another arrow A5 is used for the control current of the power regulating circuit 15 (the direction of the arrow is based on a direction approaching the error amplifier 10).

In this case, the voltage detection and the current detection are carried out for the sum of detected values related to two discharge lamps. If the detected value of the total voltage is small, the control current in the direction shown in the arrow A1 is increased. Moreover, if the detected value of the total current is large, the control current in the direction shown in the arrow A2 is increased.

If two discharge lamps are turned on in the steady-state domain, the power regulating circuit 15 can know that a light indication is sent to both discharge lamps or both discharge lamps are on upon receipt of the signal SH and the signal SL. At this time, accordingly, the control may be carried out such that the sum of the value of the power supplied to the discharge lamp is smaller than that of the rated power value with an increase in the control current shown in the arrow A5. If it is assumed that both rated power values of the discharge lamps are 35 watts, the sum of the supplied power value in the steady-state domain is controlled to be smaller than 35×2=70 watts, for example, approximately 60 watts (the sum of the control current values shown in the arrows A1, A2, A3 and A5 is set to be zero ampere at this time).

If only one of the two discharge lamps having the same rated power value is turned on, the values of the detected voltage and the detected current are almost half of those obtained when both discharge lamps are turned on. Therefore, the power regulating circuit 15 may regulate the control current shown in the arrow A5 such that the supplied power in the steady-state domain has a rated power value thereof upon receipt of one of the signals SH and SL. If it is assumed that the rated power value of the discharge lamp is 35 watts, the supplied power value in the steady-state domain is controlled to have this value (the sum of control current values shown in the arrows A1, A2, A3 and A5 is set to be zero ampere at this time).

In the present example, when the power regulating circuit 15 is newly provided and receives the signals SH and SL, the control is carried out with a power value predefined for those signals. It is also possible to employ such a structure that the signals SH and SL are sent to the steady-state power regulating circuit 14 to carry out the same power control as that performed by the power regulating circuit 15 (in that case, the sum of the control current values shown in the arrows A1, A2 and A3 is set to be zero ampere in a state in which a predetermined power value in the steady-state domain is supplied to the discharge lamp).

In the circuit configuration in (I), one error amplifier can be shared for the power control of two discharge lamps. On the other hand, it is necessary to detect the total voltage and current for the voltage detecting circuit 11N and the current detecting circuit 12N.

Figure 9:
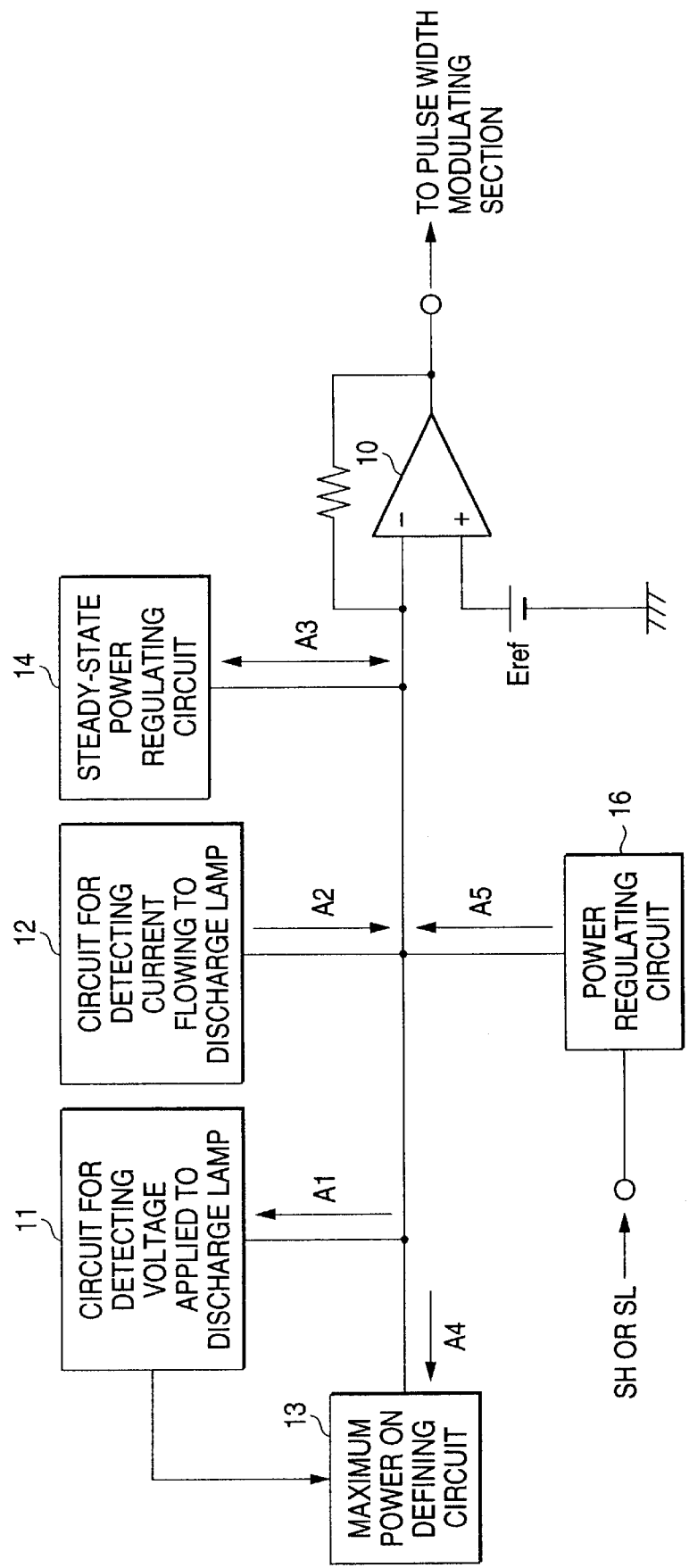
FIG. 9 is a diagram showing the structure of a main part of a second circuit configuration of the control circuit according to an implementation of the present invention.

FIG. 9 shows an example of the structure of the circuit configuration in (II), in which a power regulating circuit 16 is added to a structure having the structure shown in FIG. 7 prepared for each discharge lamp. In the drawing, there is shown only a main part of the circuit related to power control for one of the discharge lamp for main beam or the discharge lamp for dipped beam. For example, if the shown circuit is used for the discharge lamp for main beam, the power regulating circuit 16 changes a control current for the negative side input of the error amplifier upon receipt of the input of the signal SL, thereby carrying out the power control of the discharge lamp in response to the output signal of the error amplifier. Moreover, if the shown circuit is used for the discharge lamp for dipped beam, the power regulating circuit 16 changes a control current for the negative side input of the error amplifier upon receipt of the input of the signal SH, thereby carrying out the power control of the discharge lamp in response to the output signal of the error amplifier.

In this case, the voltage and current detection for each discharge lamp is carried out separately. Therefore, an operation to be carried out is the same as that performed by the voltage detecting circuit 11 and current detecting circuit 12 shown in FIG. 7.

If the present circuit is to carry out power control for the discharge lamp for main beam, power supplied to the discharge lamp for main beam can be reduced with an increase in the control current in the direction shown in the arrow A5 if it is known that the discharge lamp for dipped beam is turned on or a lighting indication is sent through the input signal SL sent to the power regulating circuit 16. As a result, the sum of the power values supplied to the discharge lamps becomes smaller than that of the rated power values thereof. For example, if it is assumed that the rated power value of the discharge lamp for main beam is 35 watts, the supplied power value in the steady-state domain is controlled to be smaller than 35 watts, for example, approximately 30 watts (the sum of the control current values shown in the arrows A1, A2, A3 and A5 is set to be zero ampere at this time).

Similarly, if the present circuit is to carry out power control for the discharge lamp for dipped beam, the power supplied to the discharge lamp for dipped beam can be reduced with an increase in the control current in the direction shown in the arrow A5 if it is known that the discharge lamp for main beam is turned on or a lighting indication is sent through the input signal SH to the power regulating circuit 16. As a result, the sum of the value of the power supplied to each discharge lamp can be smaller than that of the rated power value thereof.

In the circuit configuration in (II), the power supplied to each discharge lamp can be controlled individually, while a control circuit is required for each discharge lamp.

In above-mentioned methods (i) and (ii), the control is carried out such that the power supplied to the discharge lamp in the steady-state domain is decreased. Therefore, it is sufficient that the above-mentioned control is carried out through the power regulating circuit (15, 16). If the supplied power in the steady-state domain for one of the discharge lamps is set to be greater than the rated power value thereof as in method (iii), the control current can flow in a direction opposite to the direction shown in the arrow A5 of FIG. 9. Constant power control is carried out in the steady-state domain with such a low supplied power as to cancel a power increment. In the state in which both the discharge lamp for main beam and the discharge lamp for dipped beam are on, importance is attached to the discharge lamp for main beam, and the supplied power in the steady-state domain for the same discharge lamp is controlled to be greater than the rated power value thereof.

In order to define the supplied power value in the transient domain, the power supplied to the discharge lamp is controlled through a control current generated by the maximum power-on defining circuit (13, 13N). It is sufficient that the power on in the early stage of lighting is regulated through the control current flowing in the direction opposite to the direction shown in the arrow A4 of FIGS. 8 and 9.

A description will be given on a shifting of a peak point corresponding to a maximum power supplied to the discharge lamp.

If it is assumed that the discharge lamp for main beam is turned on to give power and the discharge lamp for dipped beam is turned on with a slight delay, the following methods can be taken to suppress heat generated by an electronic circuit.

(1) A method of monitoring the state in which the discharge lamp for main beam is turned on and controlling the change of power supply such that the maximum power is given to the discharge lamp for dipped beam when the state of the discharge lamp is changed to a steady lighting state.

(2) A method of limiting the total value of the maximum power to be given to both discharge lamps to a certain value in the transient domain after each discharge lamp has been turned on.

Method (2) is preferable to method (1) in that a long time is required for bringing the two discharge lamps into the steady-state in the method (1). Under method (2), the total value of the control currents generated by the maximum power-on defining circuits 13 and 13N is regulated to a predetermined upper limit value or less.

Figure 10:
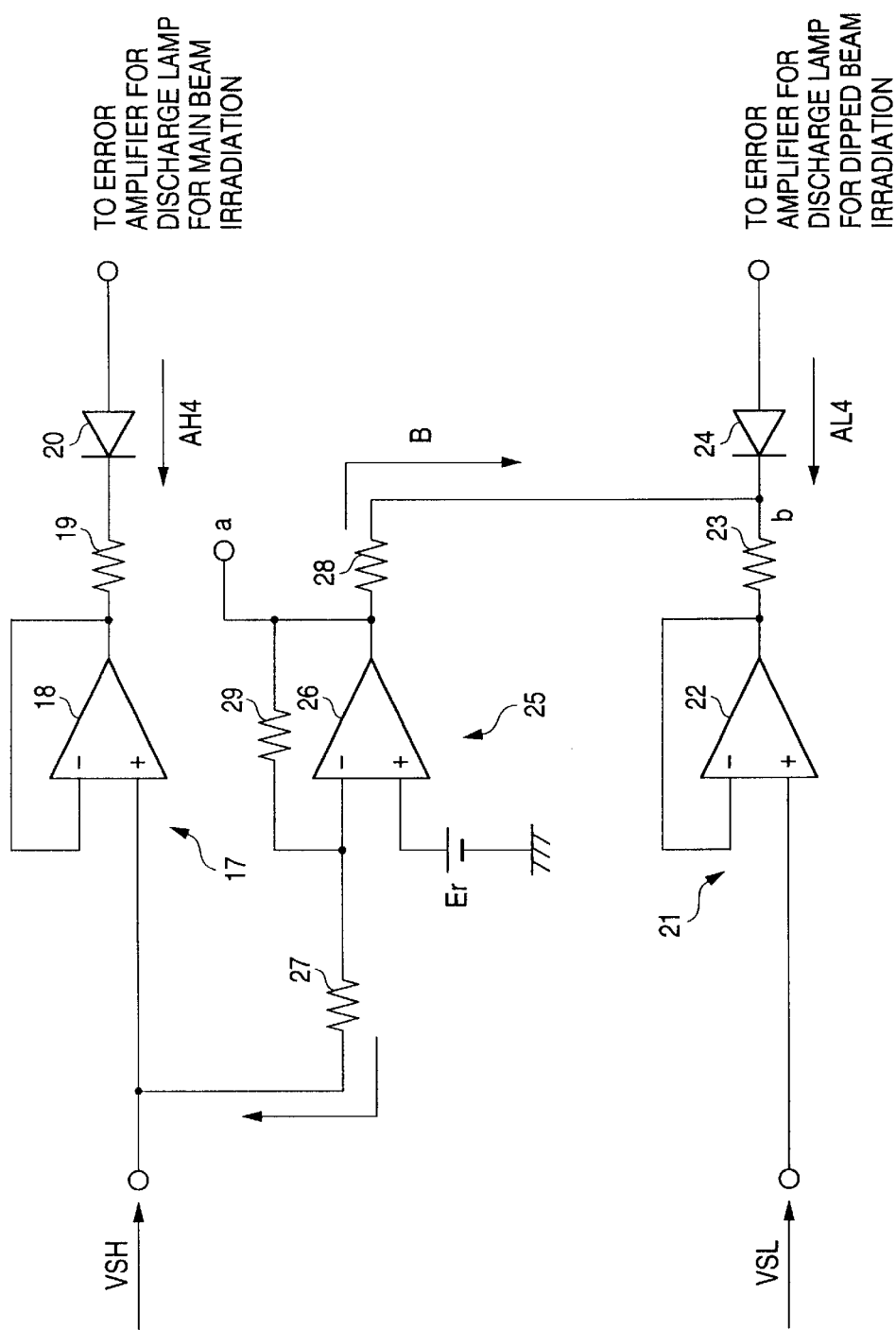
FIG. 10 is a diagram showing an example of the structure of an output stage in a maximum power-on defining circuit.

FIG. 10 shows an example of the structure of the maximum power-on defining circuit in the circuit configuration of (II), illustrating the output stage of the circuit.

In the drawing, signals "VSH" and "VSL" are signals for detecting a voltage applied to each discharge lamp and a signal obtained through an arithmetic processing based on lighting time information (en elapsed time from a lighting start), which is a control signal for defining a maximum power-on value and is generated as a signal for limiting the current of the discharge lamp such that the power to be given is increased if the voltage of the discharge lamp is low in the transient domain and the power to be given is decreased with a rise in the voltage of the discharge lamp. The signal VSH indicates a signal related to the discharge lamp for main beam and the signal VSL indicates a signal related to the discharge lamp for dipped beam.

The signal VSH is sent to a voltage buffer 17 using an operational amplifier. That is, the signal VSH is supplied to the non-inversion input terminal of the operational amplifier 18, and an inversion input terminal is connected to the output terminal of the operational amplifier 18.

The output terminal of the voltage buffer 17 is connected to the cathode of an ideal diode 20 (a circuit having a characteristic equivalent to the ideal characteristic of a diode and constituted by using an actual diode and an operational amplifier, which is simply shown by the symbol of the diode in the drawing) through a resistor 19, and the anode of the diode is connected to the negative side input terminal of an error amplifier (related to the power control of the discharge lamp for main beam) which is not shown. In other words, a control current for power regulation in the transient domain flows in a direction shown in an arrow AH4 of FIG. 10.

A path for the signal VSL has the same structure as that for the signal VSH. The signal VSL is supplied to the non-inversion input terminal of an operational amplifier 22 constituting the voltage buffer 21, and an inversion input terminal is connected to the output terminal of the operational amplifier 22. The output terminal of the operational amplifier 22 is connected to the cathode of an ideal diode 24 (see a connecting point b with a resistor 23) through a resistor 23, and the anode of the diode is connected to the negative side input terminal of an error amplifier (related to the power control of the discharge lamp for dipped beam) which is not shown. In other words, a control current for power regulation flows in the transient domain in a direction shown in an arrow AL4 of FIG. 10.

In this state, the maximum power to be given to each discharge lamp in the transient domain is defined separately depending on the resistance values of the resistors 19 and 23. Therefore, the signal VSH has an influence with the output stage of the voltage buffer 21 through a differential inversion amplifier 25 as shown.

That is, the signal VSH is supplied through a resistor 27 to the inversion input terminal of the operational amplifier 26 constituting the differential inversion amplifier 25, and a predetermined reference voltage "Er" (shown by the symbol of a constant voltage source in the drawing) is supplied to the non-inversion input terminal of the operational amplifier 26. The output terminal of the operational amplifier 26 is connected through a resistor 28 to the connecting point "b" of the ideal diode 24 and the resistor 23. A resistor 29 is a feedback resistor connected to the output terminal and inversion input terminal of the operational amplifier 26. Moreover, a voltage applied to a detecting point (see a point "a" in the drawing) fetched from the output terminal of the operational amplifier 26 is sent to a lighting state detecting circuit which will be described below.

In this circuit, the magnitude of the control current shown in an arrow AL4 is changed depending on whether the electric potential of the non-inversion input terminal of the operational amplifier 26 is lower or higher than the reference voltage Er. Correspondingly, the power supplied to the discharge lamp for dipped beam is controlled. For example, if a current flows from the differential inversion amplifier 25 into the output stage of the voltage buffer 21 (connecting point "b") as shown in an arrow B of the drawing, the control current shown in the arrow AL4 is reduced or set to be zero. Therefore, the power supplied to the discharge lamp for dipped beam is controlled to be reduced.

By setting the resistance values and the ratio thereof for the three resistors 27 to 29, the total value of the control current can be regulated. Alternatively, when a time that the maximum power is given to the discharge lamp for dipped beam is to be later than a time that the maximum power is given to the discharge lamp for main beam, a delay time can be regulated.

The circuit structure for the control described in FIG. 5 will be described with reference to FIGS. 11 to 13.

Figure 11:
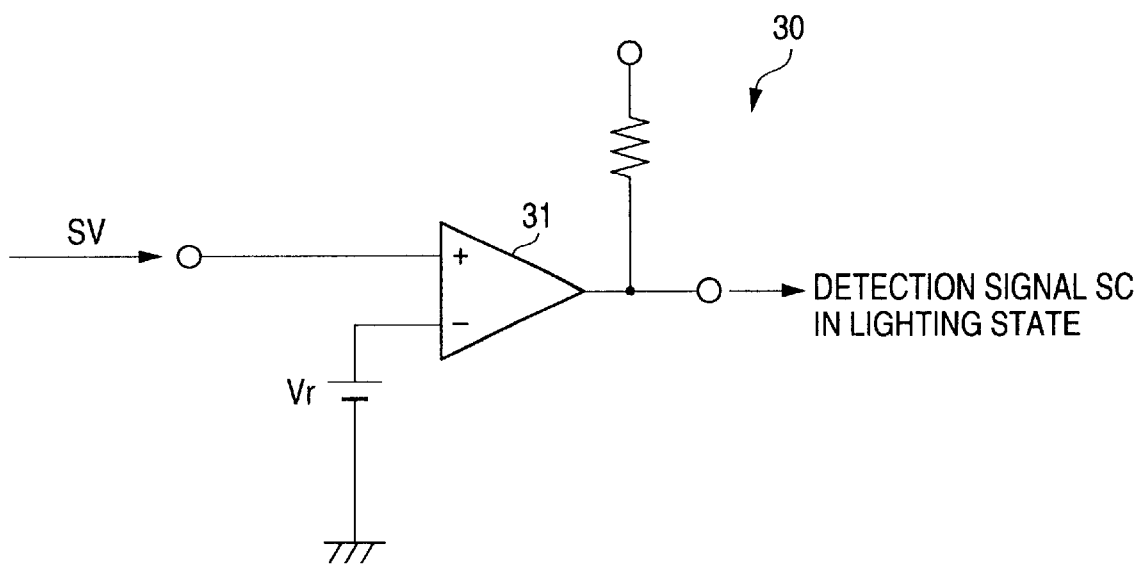
FIG. 11 is a diagram illustrating an example of the structure of a lighting state detecting circuit.

FIG. 11 shows an example of the basic structure of a lighting state detecting circuit 30 for detecting the lighting state of the discharge lamp.

A detection signal (hereinafter referred to as "SV") related to the lighting state of the discharge lamp is sent to the positive side input terminal of a comparator 31, and a predetermined reference voltage "Vr" (shown in the symbol of a constant voltage source in the drawing) is supplied to the negative side input terminal. The result of comparison is sent out as a binary signal (hereinafter referred to as "SC") of H (High level) or L (Low level).

The present circuit serves to detect whether the discharge lamp is turned on in the steady-state domain or not. Examples of a detecting method are as follows:

(1) A deciding method based on a detection signal for a voltage applied to the discharge lamp.
(2) A deciding method based on a control current (a current shown in the arrow A4) generated from the maximum power-on defining circuit.

In method (1), the voltage applied to the discharge lamp is raised further if the discharge lamp is closer to the steady-state condition, and when the detection value of the voltage exceeds a preset threshold (corresponding to the reference voltage Vr) a decision is made to make a change in the steady-state condition. Consequently, an H signal indicative of the decision is sent out. In this case, accordingly, the detection signal SV is a voltage detection signal for the discharge lamp.

In method (2), the control current does not flow from the maximum power-on defining circuit in the steady lighting state of the discharge lamp, and when the detection value of the control current becomes smaller than a preset threshold (corresponding to the reference voltage Vr) a decision is made to make a change in the steady-state condition. Consequently, a signal (L) indicative of the decision is sent out. For example, an electric potential on a detecting point indicated as a point "a" shown in FIG. 10 is detected (that is, a detection signal SV is a voltage detection signal on the point "a"), and is compared with the reference voltage Vr (=Er). Consequently, a change of the discharge lamp from the transient domain to the steady-state domain can be detected. For example, if the detection voltage is higher than the reference voltage at the point "a", a current flows to the resistor 28. In this state, therefore, the state of the discharge lamp is in the transient state.

Figure 12:
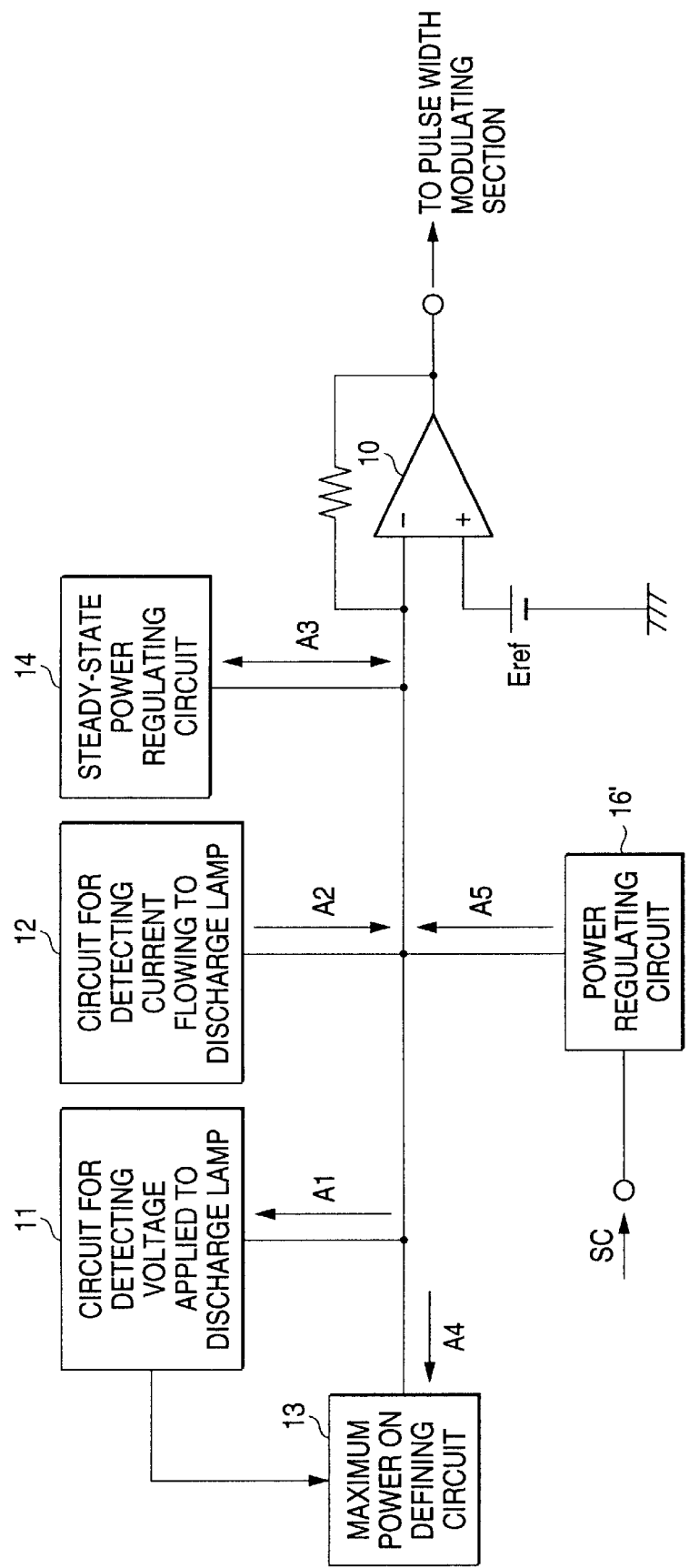
FIG. 12 is a diagram showing the main part of the control circuit constituted to control the power of the discharge lamp in response to a detection signal sent from the lighting state detecting circuit in the second circuit configuration of the control circuit according to an implementation of the present invention.

FIG. 12 shows an example of the structure of a control circuit for controlling the power supplied to one of the discharge lamps according to the state of lighting of the other discharge lamp.

The present circuit serves to control power such that the power supplied to the discharge lamp for dipped beam is smaller than the rated power value thereof when the discharge lamp for main beam is turned on and is brought into the steady-state condition, and basically has the same structure as that of FIG. 9 and is different from the structure in that the power regulating circuit 16' generates a control current (see the arrow A5) to flow to the negative side input of the error amplifier 10 related to the power control of the discharge lamp for dipped beam upon receipt of the output signal SC of the lighting state detecting circuit 30.

That is, when the power regulating circuit 16' knows that the discharge lamp for main beam is brought into the steady-state condition after the lighting upon receipt of the signal SC, the control is carried out such that the control current in the direction shown in the arrow A5 flows (when a current value in this direction is greater, the power supplied to the discharge lamp for dipped beam is decreased).

Figure 13:
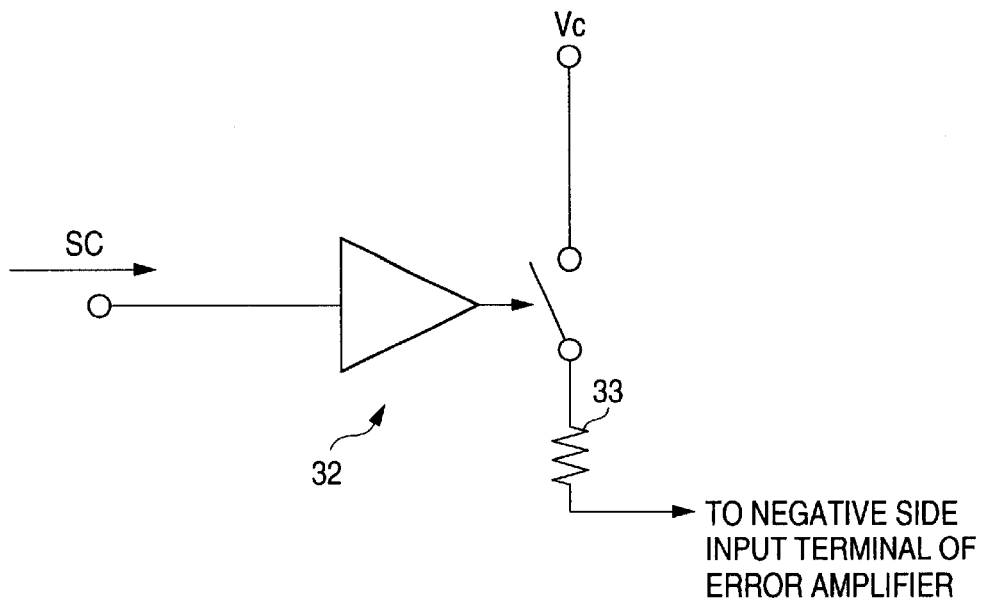
FIG. 13 is a diagram showing an example of the basic circuit of a power regulating circuit together with FIG. 14, illustrating an example of a structure using an analog switch.
Figure 14:
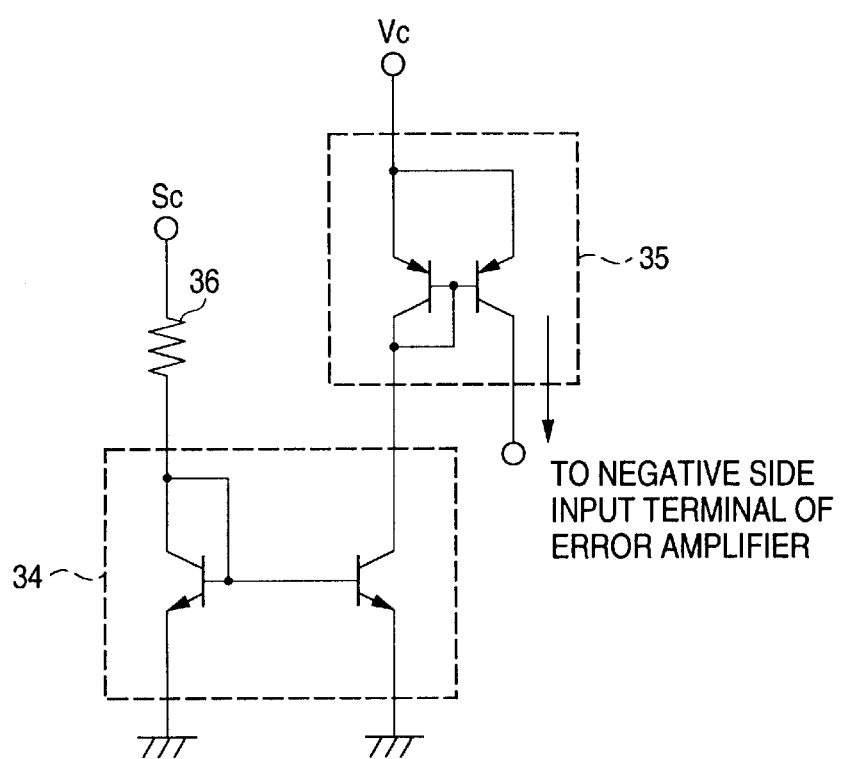
FIG. 14 is a diagram showing an example of a structure using two current mirror circuits.

FIGS. 13 and 14 show an example of the structure of a basic circuit related to the power regulating circuit.

In FIG. 13, a predetermined voltage "Vc" is supplied to the negative side input terminal of the error amplifier through an analog switch 32 for being operated upon receipt of the signal SC (which can be constituted by a field effect transistor, for example) and a resistor 33 connected thereto in series. When the signal SC has the High level (the discharge lamp is brought into the steady-state), the analog switch 32 is brought into an ON state. At this time, a current is supplied as the control current shown in the arrow A5 of FIG. 12 to the negative side input terminal of the error amplifier.

In FIG. 14, two current mirror circuits 34 and 35 are provided for the signal SC. The current mirror circuit 34 in a first stage is constituted by two NPN transistors, the current mirror circuit 35 in a second stage is constituted by two PNP transistors, and the collector output of the PNP transistor positioned in an output stage is supplied to the negative side input of the error amplifier. Accordingly, after the current flowing in a resistor 36 (which is connected to the collector of a transistor in a first stage in the current mirror circuit 34) according to the level of the signal SC is sequentially turned back through each current mirror circuit, it is supplied as the control current shown in the arrow A5 of FIG. 12 to the negative side input terminal of the error amplifier.

Also, the power regulating circuit 16 can be constituted by properly carrying out a change such as the substitution of the signal SC for the signal SH or SL in those circuits. Since the voltage detecting circuit and the current detecting circuit can be constituted by an operational amplifier known in the art, for example, JP-A-4-141988, their description will be omitted.

In the above implementation, the supplied power should not be rapidly reduced to be smaller than the rated power value of the discharge lamp or the total value thereof. The power supplied to the discharge lamp should be gradually decreased with a passage of time to reach a constant value (a steady-state stable value). The reason is as follows. If the power supplied to the discharge lamp is instantaneously lowered, a drastic reduction in the intensity of light might cause a vehicle driver to be surprised or might cause a field of view to be adversely affected.

For this reason, the simplest circuit may have a counting means to be operated upon receiving an indication signal (a power lowering indication signal) for lowering the power supplied to the discharge lamp) and control means for decreasing the power supplied to the discharge lamp with a passage of time according to an increase or decrease in an output signal level.

Figure 15:
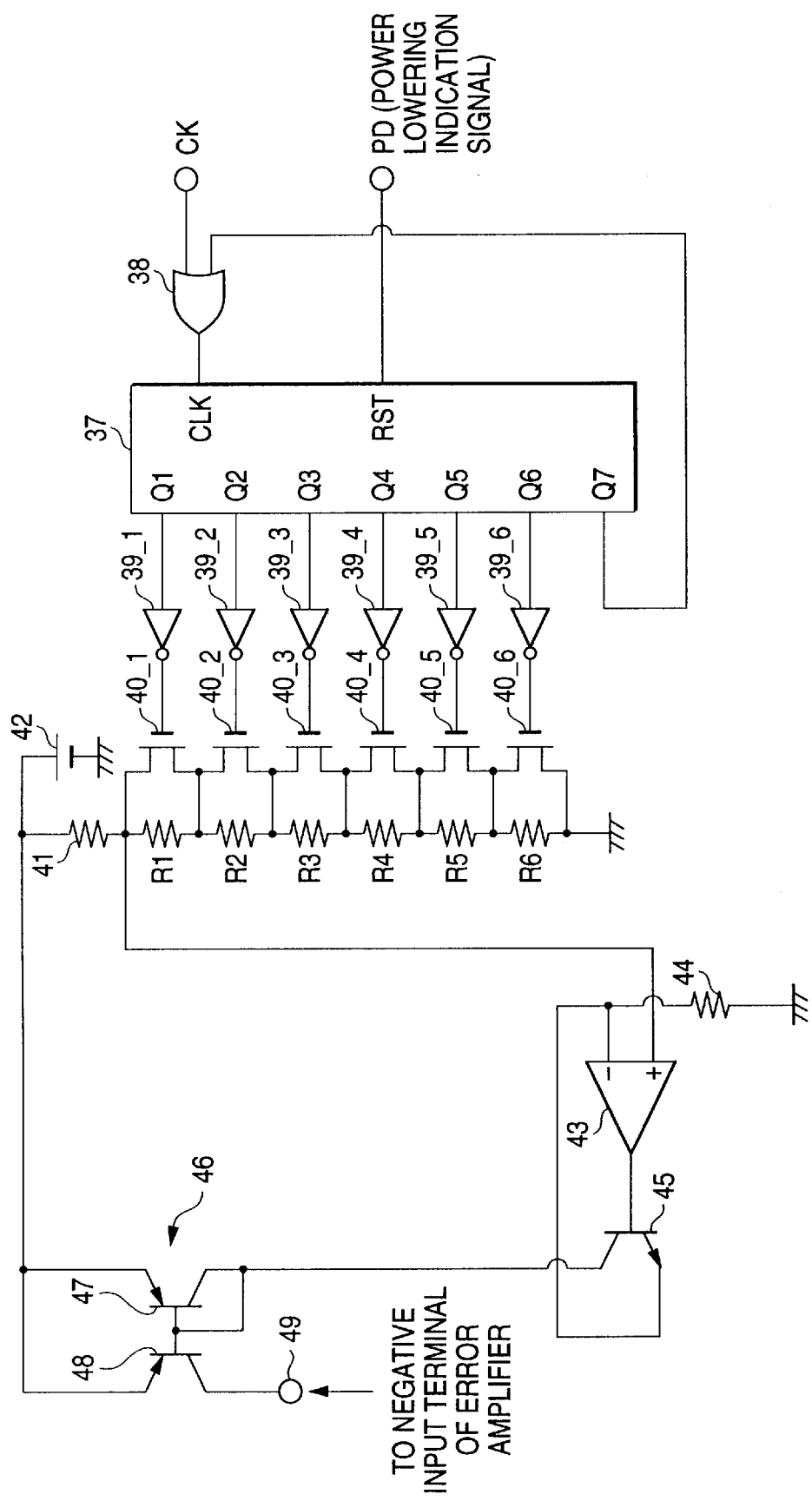
FIG. 15 is a diagram showing an example of a structure for gradually reducing a power supplied to the discharge lamp.

FIG. 15 shows a main part of an example of the structure of a circuit for gradually reducing the power supplied to the discharge lamp with a passage of time. In the present example, there are shown an up counter corresponding to the counting means and control means including a circuit section for controlling an input current supplied to the error amplifier 10 by utilizing the output of the counter.

A clock signal (hereinafter referred to as "CK") is supplied from a clock signal generating circuit which is not shown to a clock signal input terminal (CLK) of a counter 37 through a 2-input OR (logical sum) gate 38. An output signal of a seventh bit output terminal "Q7" of the counter 37 is supplied to the other input terminal of the OR gate 38.

A power lowering indication signal (hereinafter referred to as "PD") is supplied to the reset terminal (RST) of the counter 37. The counter 37 is reset when the signal has the H level.

After output signals obtained from the output terminals "Q1" to "Q6" of first to sixth bits in the counter 37 are inverted through NOT (logical NOT) gates 39_1 to 39_6, they are separately sent to switch elements 40_1 to 40_6 connected to the NOT gates.

Each switch element is provided for resistors RI to R6 connected to a resistor 41 in series. When a natural variable "i" (=1, 2, . . . , 6) is introduced, the output side terminal of the switch element 40_i is connected to both ends of a resistor Ri and the use of a resistor corresponding to the element is defined through ON/OFF control for the switch element. While an FET or an analog switch is used for each switch element, it is desirable that the resistor Ri should be added as a series resistor to function when the switch element 40_i is brought into an OFF state. In the present example, when the resistance value of R1 is indicated as "R," the resistance value of the resistor Ri is defined as R×2(i−1) (representing an exponent). Every time a value of i is increased by 1, the resistance value is doubled.

A predetermined voltage is supplied to one of the ends of the resistor 41 through a constant voltage source 42, and one of the ends of the resistor R6 positioned in a lowermost stage is grounded.

An operational amplifier 43 has a non-inversion input terminal connected between the resistor 41 and the resistor R1, and an inversion input terminal grounded through a resistor 44 and connected to the emitter of an NPN transistor 45 in a second stage.

The output signal of the operational amplifier 43 is supplied to the base of the transistor 45, and a collector current thereof is turned back through a current mirror 46 in a second stage and is supplied to the negative side input terminal of the error amplifier 10 (not shown). The current mirror 46 is constituted by two PNP transistors 47 and 48. In other words, a voltage is supplied from the constant voltage source 42 to each of the emitters of these transistors, the bases of the transistors are connected to each other and to each of the collectors of the transistors 47 and 45, and the collector of the transistor 48 is connected to an output terminal 49.

In the present circuit, when the power lowering indication signal PD has the H level, the counter 37 is reset. Therefore, all the switch elements 40_1 to 40_6 are brought into an ON state. Consequently, both ends of each of the resistors R1 to R6 are short-circuited. As a result, a voltage supplied to the non-inversion input terminal of the operational amplifier 43 is set to be zero volt so that the current input to the error amplifier 10 is not affected.

Moreover, when the power lowering indication signal PD has the L level, the counter 37 counts the clock signal CK and a result of the counting is sent from the output terminals Q1 to Q6 to the switch element through each NOT gate so that an ON/OFF state thereof is defined. In other words, the composite resistance values of the resistors R1 to R6 are changed stepwise in response to a signal supplied to each switch element and the voltage supplied to the non-inversion input terminal of the operational amplifier 43 is increased stepwise with a passage of time. Consequently, a current flowing into the negative side input terminal of the error amplifier 10 is gradually increased. As described above, a power control system circuit has such a structure that the power supplied to the discharge lamp is reduced when the current flowing to the negative side input terminal has a greater value. Therefore, power control is carried out such that the power supplied to the discharge lamp is reduced according to an increase in the composite resistance value of the resistors R1 to R6 for a period from a time that the counter 37 first starts to count the clock signal CK to a time that final count-up is performed (that is, the signal having the H level is supplied from the output terminal Q7 of the counter 37 to the OR gate 38 so that the counter 37 does not accept the signal CK). After a period of time, the control is carried out at a constant power (a steady-state power value).

If the speed of the control for lowering the power supplied to the discharge lamp is to be changed, it is desirable that the fundamental frequency of the clock signal CK be set differently and varied. The period for which the supplied power is lowered depends on the use of the discharge lamp. For example, in the application of the lighting circuit for the discharge lamp, an order of several hundreds milliseconds to several minutes is desired such that the driver of a vehicle, the driver of a car coming from the opposite direction and a road user would not be surprised or endangered because of a change in the intensity of light.

According to the first implementation of the present invention, the sum of the supplied power value in the steady lighting state of each discharge lamp is smaller than that of the rated power value of the discharge lamp. Consequently, the load of the lighting circuit can be reduced. Accordingly, it is not necessary to use expensive components of a circuit that have a high breakdown voltage and a large capacity. Thus, the size and cost of the device can be reduced. Moreover, the intensity of light can be controlled to prevent the light of the discharge lamps from being brighter than necessary. Thus, power can be saved.

According to the second implementation of the present invention, when the discharge lamp for main beam is to be turned on, the light of the discharge lamp contributes as a main light in the light distribution of the main beam. Therefore, the light can be utilized more efficiently such that the value of the power supplied to the discharge lamp for dipped beam is smaller than the rated power value thereof.

According to the third implementation of the present invention, when the discharge lamp for main beam and the discharge lamp for dipped beam are to be turned on at the same time, an excessive load is not applied to the lighting circuit with an increase in the sum of the value of the power supplied to both discharge lamps.

According to the fourth implementation of the present invention, the peak times corresponding to the maximum power values supplied to both discharge lamps are not equal to each other. Consequently, the load of the lighting circuit can be reduced.

According to the fifth implementation of the present invention, the value of the power supplied to the discharge lamp for dipped beam is smaller than the rated power value thereof after the discharge lamp for main beam is turned on and is then brought into the steady-state condition. Consequently, the intensity of light required until the lighting state of the discharge lamp for main beam is stabilized can be supplemented with the light of the discharge lamp for dipped beam. In other words, if the value of the power supplied to the discharge lamp for dipped beam is smaller than the rated power value at the time that the lighting of the discharge lamp is started irrespective of the lighting state of the discharge lamp for main beam, the intensity of light may be drastically changed. According to the fifth implementation of the present invention, such a drawback can be eliminated.

According to the sixth or seventh implementation of the present invention, the power supplied to the discharge lamp is gradually decreased with a passage of time to have a constant value. Consequently, the intensity of light can be prevented from being rapidly reduced and a stable operation can be guaranteed such that the driver of a vehicle would not be surprised and endangered. Several implementations of the invention have been described herein, but it should be understood that various additions and modifications could be made which fall within the scope of the following claims.

What is claimed is:

1. A discharge lamp device for a vehicle comprising:
   a discharge lamp for main beam;
   a discharge lamp for dipped beam; and
   a lighting circuit for lighting the main and dipped beam discharge lamps;
   wherein the lighting circuit is configured to control the power supplied to the main and dipped beam discharge lamps such that a total power supplied to the main and dipped beam discharge lamps while both are simultaneously on and in steady state is smaller than the sum of rated power values of the main and dipped beam discharge lamps.

2. The discharge lamp device for a vehicle according to claim 1 wherein when the discharge lamp for main beam and the discharge lamp for dipped beam are on, the lighting circuit controls the power supply such that a value of power supplied to the discharge lamp for main beam is greater than the rated power value of the discharge lamp and a value of power supplied to the discharge lamp for dipped beam is smaller than the rated power value of the discharge lamp.

3. The discharge lamp device for a vehicle according to claim 1 wherein when the discharge lamp for main beam and the discharge lamp for dipped beam are to be turned on at the same time, the lighting circuit controls the power supply such that a value of power supplied to the discharge lamp for main beam or the discharge lamp for dipped beam is smaller than the rated power value of the discharge lamp.

4. The discharge lamp device for a vehicle according to claim 1 wherein when the discharge lamp for main beam and the discharge lamp for dipped beam are to be turned on at the same time, the lighting circuit controls the power supply such that a time of a value of maximum power supplied to one of the discharge lamps is shifted with respect to a time of a value of maximum power supplied to the other discharge lamp.

5. The discharge lamp device for a vehicle according to claim 1 wherein when the discharge lamp for main beam is to be turned on in a state in which the discharge lamp for dipped beam is on, the lighting circuit controls the power supply such that a value of power supplied to the discharge lamp for dipped beam is decreased to be smaller than the rated power value thereof at a time that the discharge lamp for main beam is brought into a steady-state condition after lighting.

6. The discharge lamp device for a vehicle according to claim 1 wherein when a supplied power is to be smaller than the rated power value of the discharge lamp or a total value thereof, it is gradually decreased with a passage of time to reach a constant value.

7. The discharge lamp device for a vehicle according to claim 2 wherein when a supplied power is to be smaller than the rated power value of the discharge lamp or a total value thereof, it is gradually decreased with a passage of time to reach a constant value.

8. The discharge lamp device for a vehicle according to claim 3 wherein when a supplied power is to be smaller than the rated power value of the discharge lamp or a total value thereof, it is gradually decreased with a passage of time to reach a constant value.

9. The discharge lamp device for a vehicle according to claim 5 wherein when a supplied power is to be smaller than the rated power value of the discharge lamp or a total value thereof, it is gradually decreased with a passage of time to reach a constant value.

10. The discharge lamp device for a vehicle according to claim 6 further comprising:
    counting means for being operated upon receiving a signal for lowering a power supplied to the discharge lamp, the power supplied to the discharge lamp being decreased with a passage of time according to an increase or decrease of an output signal level of the counting means.

11. The discharge lamp device for a vehicle according to claim 3, wherein the power supplied to one of the discharge lamps is controlled to be smaller than the rated power value of the discharge lamp in a transition area.

* * * * *